J. M. RYBKA.
HORSE DETACHER.
APPLICATION FILED MAY 31, 1916.
1,212,265.
Patented Jan. 16, 1917.
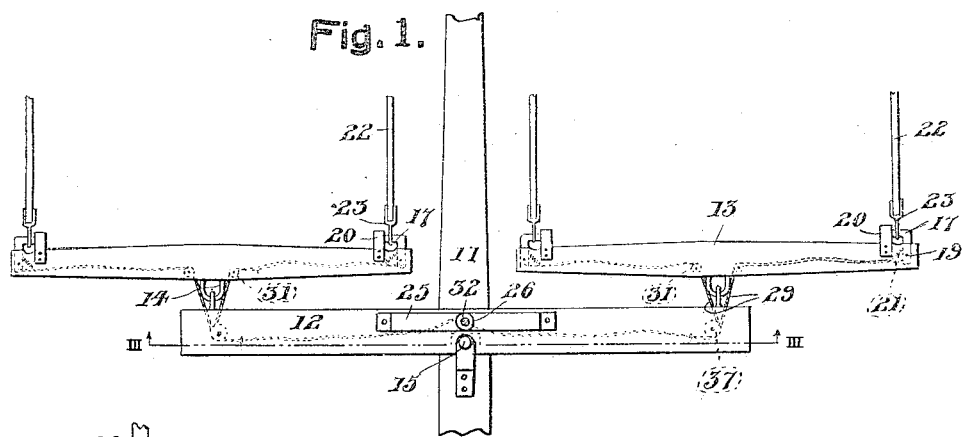
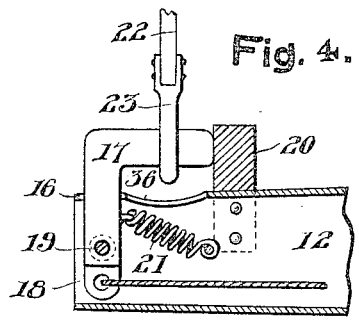
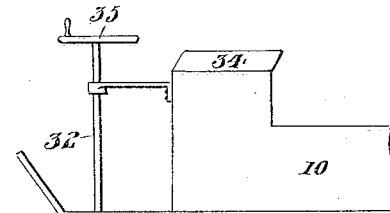
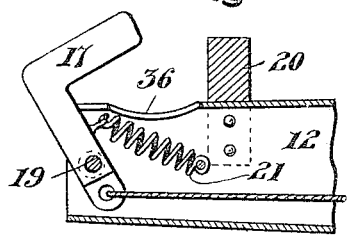
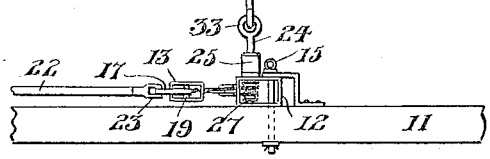
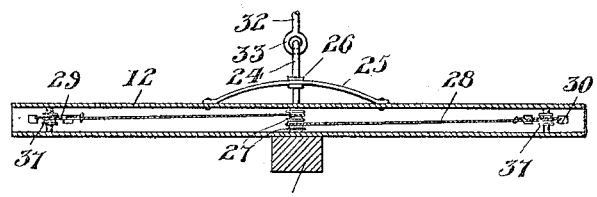
Inventor
J. M. Rybka
By A. M. Wilson
Attorney

UNITED STATES PATENT OFFICE.

JOHN M. RYBKA, OF RADISSON, SASKATCHEWAN, CANADA.

HORSE-DETACHER.

1,212,265.  Specification of Letters Patent.  Patented Jan. 16, 1917.

Application filed May 31, 1916. Serial No. 100,841.

*To all whom it may concern:*

Be it known that I, JOHN M. RYBKA, a subject of the King of Great Britain and citizen of the Dominion of Canada, residing at Radisson, in the Province of Saskatchewan and Dominion of Canada, have invented certain new and useful Improvements in Horse-Detachers, of which the following is a specification.

This invention relates to new and useful improvements in horse detachers.

The primary object of the invention is the provision of a safety attachment for vehicles whereby accidents may be prevented in the event of the running away of the horses attached thereto, the device being such as to readily release the horses from the vehicle whenever found desirable.

A further object of the device is the provision of an attachment for vehicles by means of which the tugs or traces of the harness are readily detached from the whiffletrees by mechanism operable from a point adjacent the driver's seat.

A still further object is to provide an inexpensive attachment readily applied to vehicles for detaching the draft animal or animals therefrom whenever desired by the operator such as in the event of the same becoming unmanageable.

With these general objects in view and others that will appear as the nature of the invention is better understood, the same consists in the novel combination and arrangement of parts hereinafter fully described, illustrated in the accompanying drawings and then claimed.

In the drawings forming a part of this application and in which like designating characters refer to corresponding parts throughout the several views:—Figure 1 is a top plan view of a rear portion of a wagon tongue and whiffletrees provided with the present device, the rear end portions of the harness tugs being shown in their secured positions. Fig. 2 is a side elevational view thereof including the operating means for the device. Fig. 3 is a vertical sectional view taken upon line III—III of Fig. 1. Fig. 4 is a horizontal longitudinal sectional enlarged view of one of the whiffletree ends illustrating the whiffletree hook in its closed position, and Fig. 5 is a view similar to Fig. 4 with the whiffletree hook released.

A vehicle body 10 is herein illustrated provided with a forwardly projecting attaching pole or tongue 11 for hitching the draft animals (not shown) thereto and supplied with a cross tree 12 pivoted to the same by a bolt 15 having opposite swingle trees 13 pivotally secured to the opposite ends thereof at 14 in substantially the usual manner.

The trees 13 are tubular in form having terminal slots 16 through which a whiffletree hook 17 is adapted to swing, the end 18 of the tree 13 being open for the accommodation of such hook, the latter being pivotally mounted thereto at 19. A block 20 is arranged adjacent each of the hooks 17 upon the forward edges of the trees 13 adapted to form abutments for the free ends of the hooks 17 when the same are closed, a spring 21 being provided for each of the said hooks for maintaining the latter in closed positions, as best illustrated in Fig. 4 of the drawings. The traces 22 of the harness are arranged with loops or eyes 23 at their rear ends adapted to be received over the hooks 17 when the draft animals are operatively hitched to the vehicle. Clearance notches 36 are provided in the whiffletrees 13 adjacent the normal positions of the loops 23.

A stub shaft 24 is vertically journaled through the cross tree 12 centrally thereof at one side of the pivot bolt 15, a curved strap 25 being carried by the tree 12 through which the shaft 24 also passes being adapted to maintain the said stud shaft in position, washers 26 being carried by the said stub shaft upon opposite sides of the strap 25.

A double pulley 27 is secured to the stub shaft 24 interiorly of the cross tree 12 which latter is tubular in form and is designed for receiving the inner ends of operating cords 28 therearound. The said cords 28 extend in opposite directions through the cross tree 12 and are each provided with two branch cords 29 passing through perforations 30 in the forward side of the cross tree 12 and thence entering the whiffletrees 13 and extending in opposite directions therethrough with their free ends secured to eyes in the inner ends of the aforementioned hooks 17. Sheaves 37 are provided within the cross tree 12 adjacent the opposite ends thereof for passing the cords 29 thereover, while the said cords are also passed over small sheaves 31 within the whiffletrees 13.

An operating shaft 32 is provided with a loose connection 33 with the upper end of the stub shaft 24, the said shaft 32 extending upwardly to a point adjacent the driver's seat 34 of the vehicle and is provided with an operating wheel 35 through the agency of which the stub shaft 24 may be readily revolved for winding up the cords 28 upon the pulleys 27, thus pulling inwardly upon the branch cords 29 and releasing all of the whiffletree hooks 17 simultaneously. Such releasing action of the hook 17 allows the tug rings 23 to be released whereby the draft animals are entirely separated from the vehicle and may proceed without damage thereto.

It will be understood that the cords 28 and 29 are normally slackened as best illustrated in Fig. 1 of the drawings so that the usual movements of the whiffletree members have no effect upon the hooks 17 although the device is at all times ready for actuation by means of the hand wheel 35 for releasing the draft tugs 22.

What I claim as new is:—

1. A device of the class described comprising a wagon tongue, a tubular cross tree centrally pivoted to the said tongue and having pairs of perforations through its forward side adjacent the opposite ends thereof, sheaves within the said cross tree arranged between the said pairs of perforations, tubular whiffletrees pivotally connected to the said cross tree intermediate the said perforations thereof and having slotted forward sides at each end, abutment blocks carried by the said whiffletrees adjacent the inner ends of the said slotted portions thereof, hooks pivotally attached to the opposite ends of the said whiffletrees swingingly arranged within the said slots with their free ends normally engaging the said blocks, the said hooks being right-angular in elevation with the outer end lying parallel to the whiffletree, closing springs for the said hooks mounted within the said whiffletrees connected to the hooks at points outwardly of their pivots, a stub shaft vertically journaled through the said cross tree forwardly of its pivotal connection, pulleys upon the said stub shaft within the said cross tree and operating cords carried by the said shaft pulleys running over the said cross tree pulleys and through the said perforations and whiffletrees and attached to the inner ends of the said hooks and operating means for the said stud shaft.

2. A horse detacher including a vehicle having a draft tongue, a cross tree connected to said tongue, a tubular whiffletree attached to each end of said cross tree, each whiffletree having slotted ends, spring-controlled right-angular hooks pivotally mounted in each whiffletree near each slotted end thereof, each hook having a portion extending through one of said slotted ends and a portion outside of and normally approximately parallel with said whiffletree, stop blocks for each of said hooks, and means operable from the driver's seat and connected to said hooks for swinging the same on their pivots.

In testimony whereof I affix my signature.

JOHN M. RYBKA.

Copies of this patent may be obtained for five cents each, by addressing the "Commissioner of Patents, Washington, D. C."